US006968920B2

(12) United States Patent
Barton et al.

(10) Patent No.: US 6,968,920 B2
(45) Date of Patent: Nov. 29, 2005

(54) STEERING CONTROL DURING SPLIT-MU ABS BRAKING

(75) Inventors: Andrew Dennis Barton, Coventry (GB); James Owen Patrick Farrelly, Kenilworth (GB); Mark Richard Tucker, Lutterworth (GB); Edward John Milbourn, Coventry (GB); Michael John Bayes, Royal Leamington Spa (GB)

(73) Assignee: TRW Limited, (GB)

( * ) Notice: Subject to any disclaimer, the term of this patent is extended or adjusted under 35 U.S.C. 154(b) by 35 days.

(21) Appl. No.: 10/665,724

(22) Filed: Sep. 19, 2003

(65) Prior Publication Data

US 2005/0189163 A1 Sep. 1, 2005

Related U.S. Application Data

(63) Continuation of application No. PCT/GB02/01342, filed on Mar. 20, 2002.

(30) Foreign Application Priority Data

Mar. 20, 2001 (GB) .................................... 0106925

(51) Int. Cl.[7] ................................................ B62D 5/04
(52) U.S. Cl. ......................... 180/446; 180/443; 701/41
(58) Field of Search ................................ 180/446, 443, 180/421, 403; 701/41

(56) References Cited

U.S. PATENT DOCUMENTS

| | | | | |
|---|---|---|---|---|
| 6,085,860 | A | 7/2000 | Hackl et al. | |
| 6,095,277 | A | 8/2000 | Bohner et al. | |
| 6,154,696 | A | 11/2000 | Nishi et al. | |
| 6,542,800 | B2 * | 4/2003 | Kawazoe et al. | 701/41 |
| 6,625,529 | B2 * | 9/2003 | Obata et al. | 701/41 |
| 6,705,424 | B2 * | 3/2004 | Ogawa et al. | 180/446 |
| 2002/0030407 | A1 | 3/2002 | Nishizaki et al. | |
| 2004/0016591 | A1 * | 1/2004 | Kojo et al. | 180/443 |

FOREIGN PATENT DOCUMENTS

| | | |
|---|---|---|
| DE | 196 50 475 | 4/1998 |
| DE | 197 51 227 | 9/1998 |
| EP | 1 209 053 | 5/2002 |
| JP | 11152055 | 6/1999 |

OTHER PUBLICATIONS

Document Bibliography and Abstract for DE 196 50 475 from the http://l2.espacenet.com/espacenet/viewer?PN=DE19650475&CY=ep&LG=en&DB=EPD, printed Sep. 16, 2003.
Document Bibliography and Abstract for DE 197 51 227 from the http://l2.espacenet.com/espacenet/viewer?PN=DE19751227&CY=ep&LG=en&DB=EPD, printed Sep. 16, 2003.

* cited by examiner

*Primary Examiner*—Tony Winner
(74) *Attorney, Agent, or Firm*—MacMillan, Sobanski & Todd, LLC

(57) ABSTRACT

A vehicle stability compensation system, which is arranged to adjust dynamically the self-centering position and the steering feel of the vehicle steering system during split mu braking operation. The adjustment being based on at least one operational variable representing a corrective steer angle for the vehicle and hence representing a target self-centering position. A target self-centering error is derived from the difference between the target self-centering position and an actual vehicle steering angle. A torque demand that is proportional to the target self-centering error is then added to an assistance torque generated by the electrically assisted steering system to shift the self-centering position so as to encourage the vehicle driver to move the steering wheel such as to reduce the target self-centering error to zero for maintaining the vehicle stable and controllable.

42 Claims, 12 Drawing Sheets

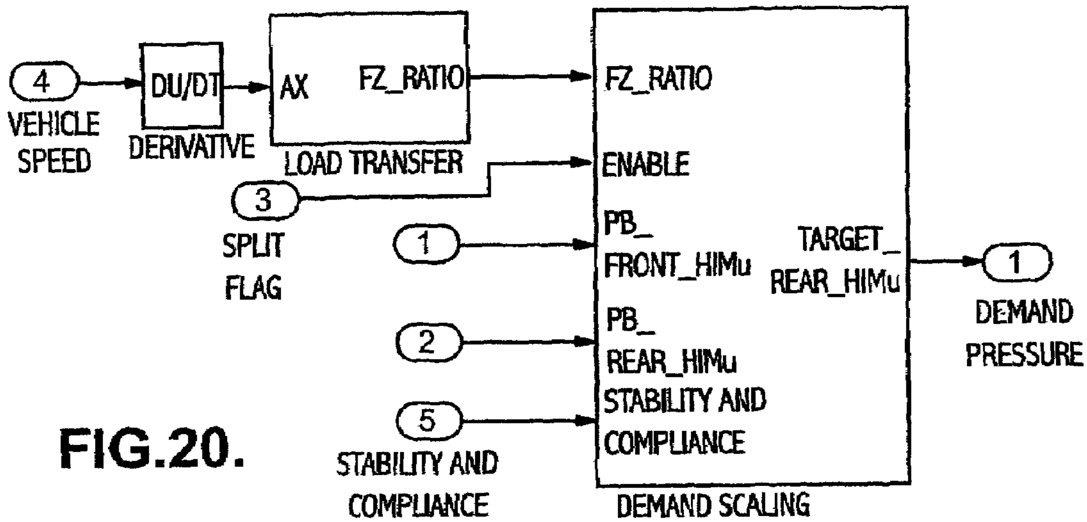
FIG.20.
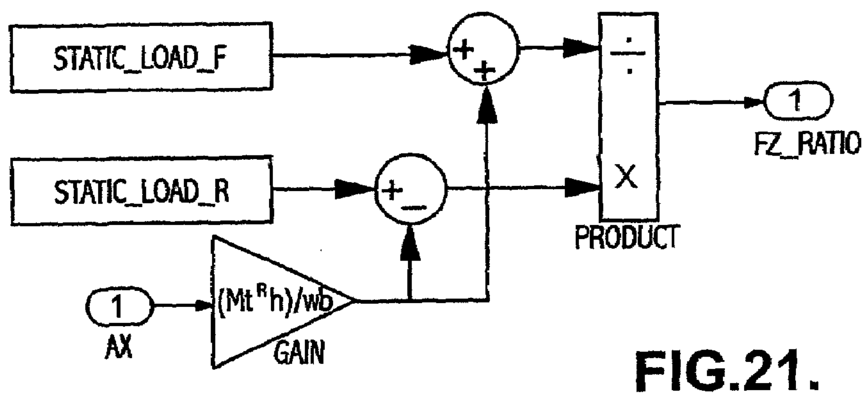
FIG.21.
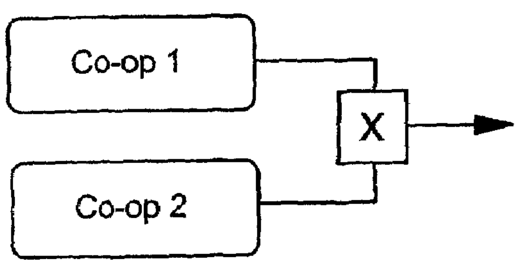
FIG.24.
FIG.25.
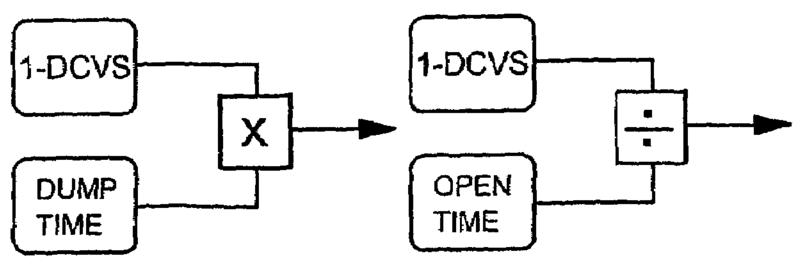

STEERING CONTROL DURING SPLIT-MU ABS BRAKING

CROSS REFERENCE TO RELATED APPLICATIONS

This application is a continuation of International Application No. PCT/GB02/01342 filed Mar. 20, 2002, the disclosures of which are incorporated herein by reference, which claimed priority to Great Britain Patent Application No. 0106925.1 filed Mar. 20, 2001, the disclosures of which are incorporated herein by reference.

BACKGROUND OF THE INVENTION

The present invention is concerned with the steering of a vehicle having an electrically assisted steering system (EAS) when running in the situation of ABS split mu operation, where the nearside and offside wheels of the vehicle are running respectively on relatively high mu and relatively low mu surfaces, or vice versa resulting in the necessity for asymmetric brake force maneuvers.

Electric assist steering systems are well known in the art. Electric assist steering systems that use, for example, a rack and pinion gear set to couple the steering column to the steered axle, provide power assist by using an electric motor to either apply rotary force to a steering shaft connected to a pinion gear, or apply linear force to a steering member having rack teeth thereon. The electric motor in such systems is typically controlled in response to (a) driver's applied torque to the steering wheel, and (b) sensed vehicle speed.

Other known electric assist steering systems include electro-hydraulic systems in which the power assist is provided by hydraulic means under at least partial control of an electronic control system.

In the latter conditions, where a split mu braking operation is taking place, the unbalanced braking torques which occur can adversely affect the vehicle stability and tend to cause the vehicle to spin.

SUMMARY OF THE INVENTION

It is one object of the present invention to provide a means which will maintain the vehicle stable and controllable by way of steering intervention when these unbalanced braking torques would otherwise tend to cause the vehicle to spin.

In accordance with the invention, there is provided a vehicle stability compensation system which is arranged to adjust dynamically the self-centering position and the steering feel of the steering system during split mu braking operation, the adjustment being based on at least one operational variable representing a corrective steer angle for the vehicle which is added to the main EAS assistance torque via a driver feedback controller whereby to maintain the vehicle stable and controllable.

One possible operational variable representing a corrective steer angle is the braking yaw moment. This can be established, for example by generating and subtracting from each other, estimates of the brake pressures at the front left and front right wheels, multiplying the difference by a constant to give the difference in brake forces for the front wheels, and dividing the result by the track width of the vehicle. The braking yaw moment is multiplied by a gain to give the corrective steer angle.

A second possible operational variable representing a corrective steer angle is yaw oscillation. This can be established, for example, by inverting a yaw rate signal, multiplying this by a gain and using the result as a feedback signal providing yaw oscillation correction.

A third possible operational variable representing a corrective steering angle is lateral drift correction. This can be established, for example, by inverting a vehicle lateral acceleration signal and applying proportional plus integral compensation to provide the lateral drift correction.

Preferably, the driver feedback controller takes one of said operational variables, or the sum of two or more of the variables, subtracts them from the actual steering angle, and adds the result to the EAS assistance torque, advantageously by way of a gain and a limiter. Steering velocity feedback can be applied to prevent the shift resulting in under-damped steering oscillations. Preferably, the driver feedback is phased out at lower speeds to avoid impeding low speed driver manoeuvres.

In accordance with a further aspect of this invention, there is provided a vehicle stability compensation system which is arranged to determine the dynamic state of the vehicle through assessment of the vehicle stability and/or the driver compliance wherein at least one controlled function of the brake control system is adjusted in dependence upon the dynamic state so as to maximise the available braking utilisation available. The features of subsidiary claims 2 to 42 are also applicable to the latter aspect of the invention, both singly and in combinations.

Various objects and advantages of this invention will become apparent to those skilled in the art from the following detailed description of the preferred embodiment, when read in light of the accompanying drawings.

BRIEF DESCRIPTION OF THE DRAWINGS

FIG. 20 illustrates rear wheel pressure control during split mu braking;

FIG. 21 illustrates load transfer estimation;

FIG. 24 shows the use of a multiplier in connection with the generation of driver compliance;

FIG. 25 shows diagrams of elements for use in the establishment of vehicle stability;

DETAILED DESCRIPTION OF THE INVENTION

The present technique involves the generation of one or more variables representing corrective steer angle demands for the vehicle which is/are supplied to a "driver feedback" controller to produce an output signal for modifying the EAS assistance torque.

Steer Angle Demand

These operational variables required to produce the steer angle demand are:

a) Yaw Moment Estimate b) Yaw Rate Feedback of "oscillation"; and c) Lateral Drift Compensation.

Figure 1:
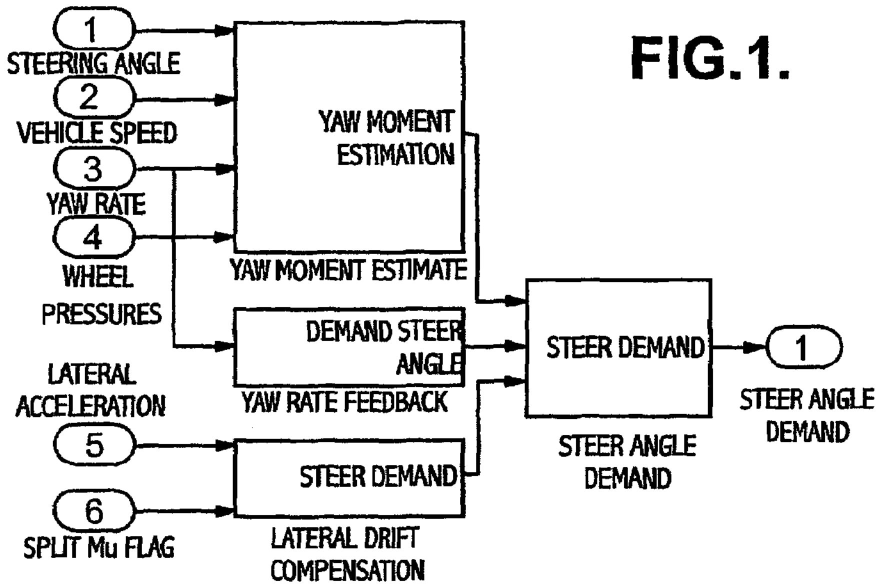
FIG. 1 is a block diagram showing generation of steer angle demand.

An example of the steer angle demand process is illustrated in FIG. 1 which shows steer angle demand based on various signals, these demand steer angles then being combined to give an overall demand steer angle, taking into account the various possible components.

The establishment of the various variables is now described separately.

(a) Yaw Moment Estimation (1) Yaw Moment Estimation from Brake Pressure

Figure 2:
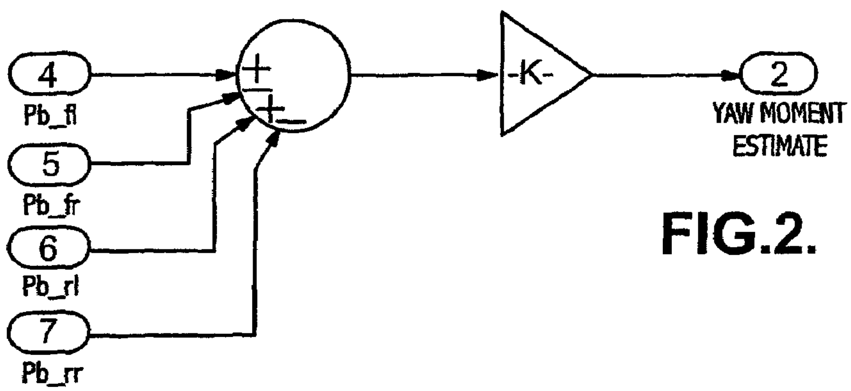
FIG. 2 illustrates yaw moment estimation from brake pressure.

Measured or Estimated Wheel pressures are compared to give the total difference in applied brake pressure across the vehicle. This is multiplied by a gain to give an estimate of the yaw moment across the vehicle. The gain is made up of estimated brake gain (brake pressure to longitudinal tire force) and vehicle track width (see FIG. 2).

(2) Yaw Moment Estimation from Different Pressure Across Front Axle

Figure 3:
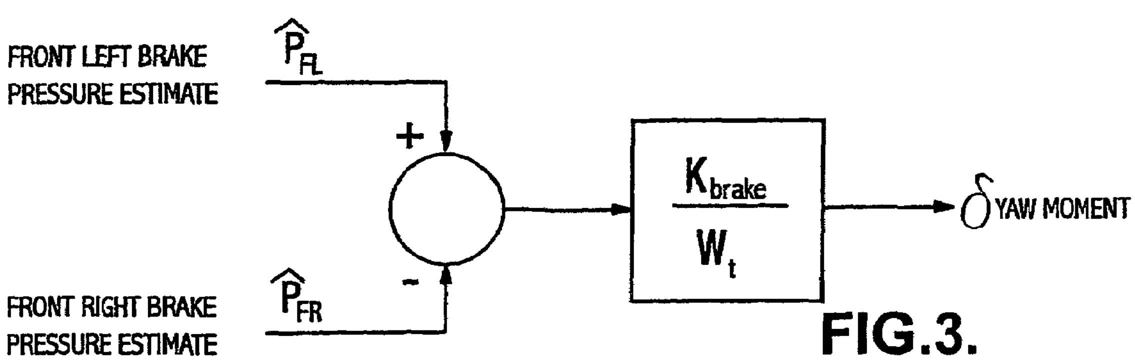
FIG. 3 illustrates yaw moment estimation from front axle brake pressures.

Referring to FIG. 3, the ABS algorithm contained within the ABS software generates a flag to indicate that split mu braking is taking place. It also generates estimates of brake pressure at each front wheel. These front left and right brake pressure estimates (PFL, PFR) are used to compute a brake yaw moment, and hence a corrective steering angle demand. The difference in brake pressure estimates for the front wheels is multiplied by a constant K brake to give the difference in brake forces for the front wheels. This difference in forces is divided by the track width WT to give the braking yaw moment. The braking yaw moment is multiplied by a gain to give the corrective steer angle. It is an absolute angle not a torque.

(3) Yaw Moment Estimation Through Vehicle Model and Feedback Loop

Figure 4:
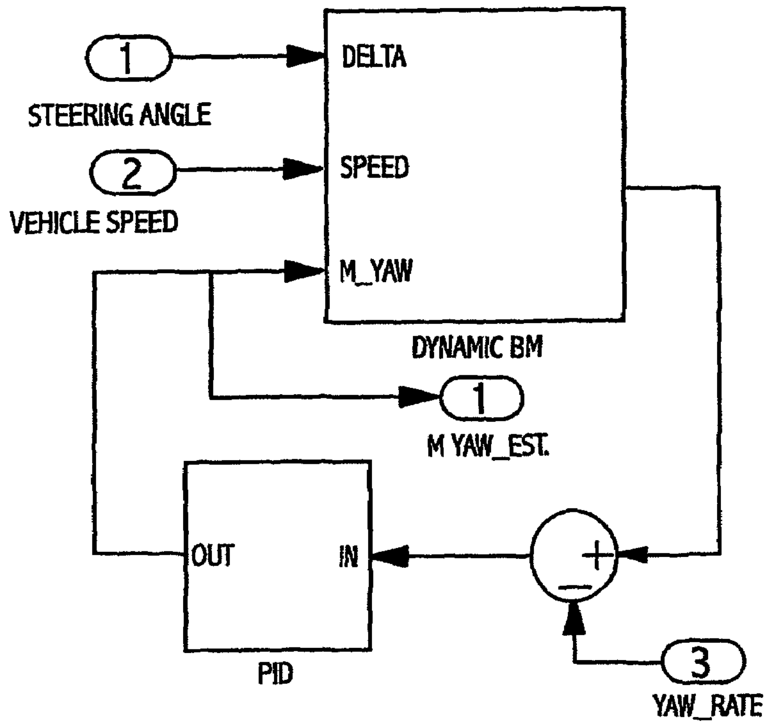
FIG. 4 illustrates yaw moment estimation through a vehicle model and feedback loop.

This is illustrated in FIG. 4 and uses a dynamic block BM which implements the following vehicle model:

Lateral Dynamics:

$$M\dot{v} = \left(\frac{-2(C_{\alpha f} + C_{\alpha r})}{U}\right)v - \left(\frac{2(aC_{\alpha f} + bC_{\alpha r})}{U} + U\right)r + 2C_{\alpha f}\delta$$

Yaw Dynamics:

$$I_{zz}\dot{r} = \left(\frac{-2(aC_{\alpha f} + bC_{\alpha r})}{U}\right)v - \left(\frac{2(a^2C_{\alpha f} + b^2C_{\alpha r})}{U}\right)r + 2aC_{\alpha f}\delta + M_\Psi$$

Where v=Lateral Velocity (m/s)–state
r=Yaw Rate (rad/s)–state
δ=Steer Angle of Front Wheels (rad)–input
$M_\Psi$=Disturbance Yaw Moment (Nm)–input
$C_{\alpha f}$=Front Single Wheel Cornering Stiffness (N/rad)
$C_{\alpha r}$=Rear Single Wheel Cornering Stiffness (N/rad)
a=Distance Front Axle to Centre of Gravity (m)
b=Distance Rear Axle to Centre of Gravity (m)
M=Vehicle Total Mass (kg)
$I_{ZZ}$=Vehicle Yaw Inertia (kg/m$^2$)
U=Vehicle Speed (m/s)

This is a well-recognised two degree-of-freedom vehicle model with the addition of a direct yaw moment term in the yaw dynamics formula. This term describes any additional yaw moment disturbance not accounted for by the steering input. The model is driven by inputs of steering angle (at the road wheels), yaw moment disturbance input and vehicle speed. The output is estimated yaw rate of the model.

The output of the vehicle model is compared to the actual yaw rate of the vehicle to give a yaw rate error. This error is processed by a compensator block (in this case a PID compensator) which drives the yaw moment input of the vehicle model in an attempt to minimise the yaw rate error. This yaw moment estimate is the output used for subsequent control.

Figure 5:
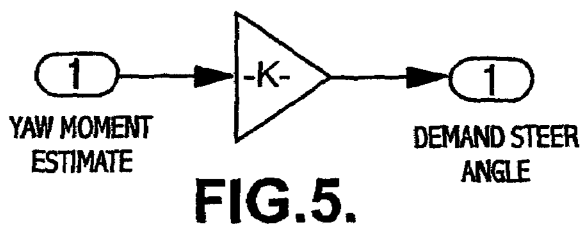
FIG. 5 illustrates steer angle demand from yaw moment estimate.

The output of FIG. 4 and the outputs of the other optional brake pressure yaw moment functions are further led to the circuit of FIG. 5 to produce steer angle demand as described further hereinafter. As shown in FIG. 5 the demand steer angle is generated by multiplying the chosen yaw moment estimate by a gain.

(b) Yaw Rate Feedback (1) Yaw Rate Oscillation

Figure 6:
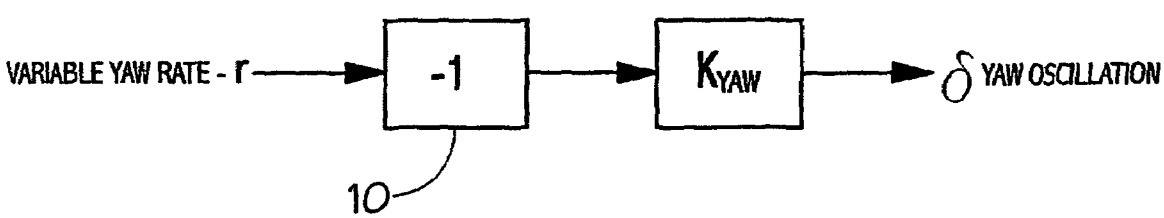
FIG. 6 illustrates steering angle demand from yaw rate oscillation.

Referring to FIG. 6, the yaw dynamics of a vehicle in a split mu stop are different from normal running. The vehicle tends to yaw at a lower frequency of about 1 Hz. This change in yaw dynamics is hard for the driver to control. The yaw rate signal r is inverted at 10, and multiplied by a gain Kyaw, and used as a feedback signal to generate an additional corrective steering angle demand to assist the driver in controlling the yaw dynamics.

(2) Yaw Compensation by Steering Velocity Control

Figure 7:
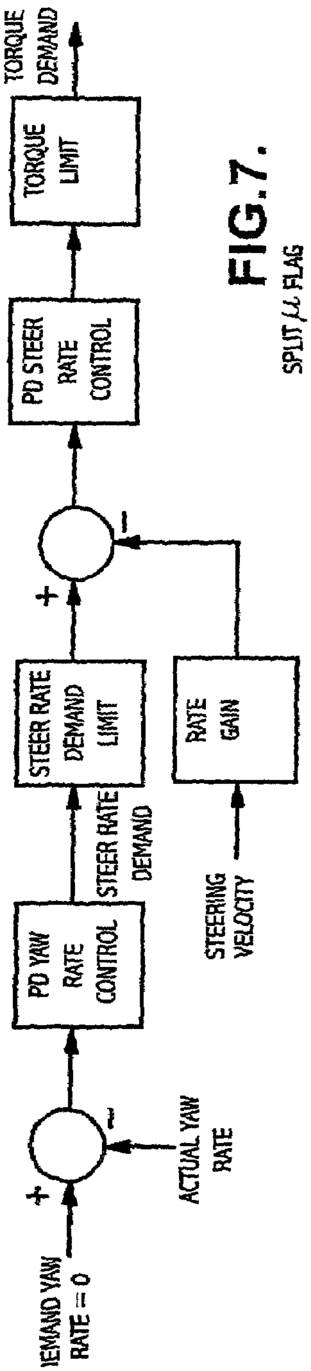
FIG. 7 illustrates yaw compensation by steering velocity control.

The aim of the closed loop steering wheel velocity controller, shown in FIG. 7 is to attempt to match the yaw rate of the front road wheels with the yaw rate of the vehicle but the opposite sign. This has the effect of causing the vehicle to seemingly pivot about the front wheels.

The controller assumes that the driver is attempting to reduce the yaw rate of the vehicle to zero and assists the driver in achieving this. In the first element, a PD controller is implemented on the yaw rate error signal to generate a steering rate demand This is compared with a scaled version of the handwheel velocity to produce an error signal. The final PD controller then attempts to move the handwheel with the desired direction and velocity. A limit prevents the controller applying torques that may lead to excessive handwheel velocities.

Figure 14:
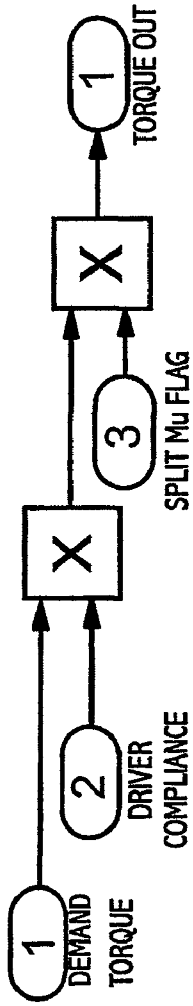
FIG. 14 illustrates enabling and scaling.

The output of the control routine would be fed for the present moment into a multiplier at a point immediately before the split mu flag switch of FIGS. 14 and 23, described hereinafter.

(c) Lateral Drift Compensation

Figure 8:
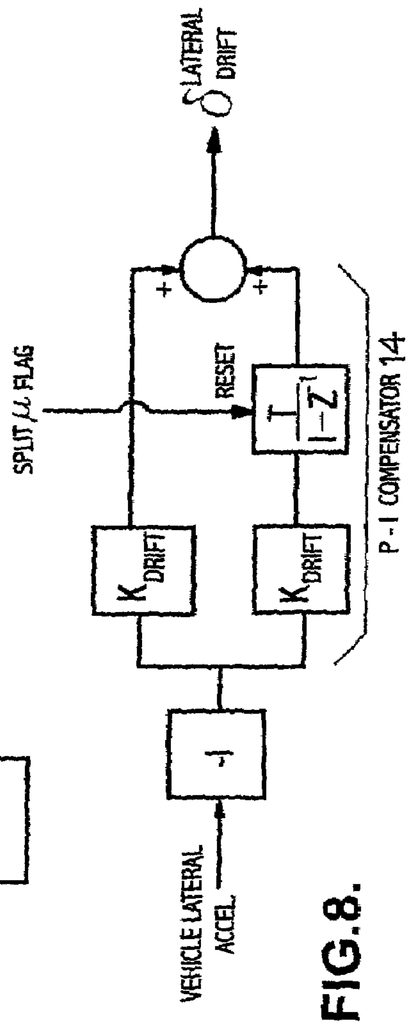
FIG. 8 illustrates lateral drift compensation.
Figure 9:
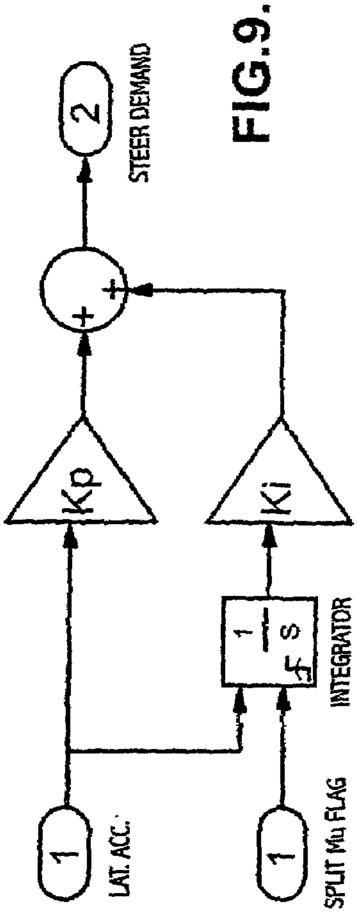
FIG. 9 illustrates lateral drift compensation from lateral acceleration.

Reference is first made to FIG. 8. To prevent the vehicle drifting off the split mu, the vehicle must adopt a yaw angle to balance the slip angle generated by the yaw moment correction steering. This is achieved by using integral feedback of lateral acceleration where the lateral acceleration is inverted at 12 and passed through proportional plus integral compensator 14 to compute a further additive corrective steering angle demand. Thus, as illustrated in FIG. 9, the vehicle lateral acceleration signal is multiplied by a gain to give a proportional steer demand signal. The lateral acceleration signal is also integrated, where the setting of the split mu flag resets the integrator, and multiplied by a gain. The proportional and integral steer demands are summed to generate the output steer demand.

Steering Position Control

The output of the steer angle demand section of the controller is fed into the steering position control section which corresponds to the central portion of the system of FIGS. 13 and 23, described hereinafter. The steering position controller accepts the steer angle demand and an error is formed with the actual steer angle, this being adjusted by a gain and then limited before a steering velocity dependent damping function is subtracted from it. This scaled and damped steering position error is then multiplied by a filtered vehicle velocity value.

Thus, the chosen combination of demand steer angle signals is compared to the measured steer angle to give a steer angle error. Steer angle error is multiplied by a gain to give a demand steering torque. Steering velocity is multiplied by a gain to give a damping torque that is subtracted from the demand steering torque. Vehicle speed is mapped against a look up table to provide a scaling factor to fade out the torque demand at low speeds. This is achieved by multiplying the damped steer demand torque by the scaling factor.

Driver Feedback Controller

A first, simple driver feedback controller is now described with reference to FIG. 23.

Having computed a steering angle demand, the requirement is then to seek to encourage the driver to apply it. This is achieved by shifting the self centering position of the steering system. The self centre position is the sum of the corrective steer angle and the two additional corrective steer angles. The difference between the self centre position and the actual position δ actual, is multiplied by a gain, K steer, the result is limited at 16 and added to the EAS assistance torque. The effect is that if the driver takes his hands off the steering wheel, the steering wheel will move to the new self-centering position. If he leaves his hands on the wheel he will feel it 'want' to move to the new self-centering position. Steering velocity feedback applied at 18 prevents this shift, resulting in under damped steering oscillations. As the self-centering controller is in essence a steering angle position controller, applying negative feedback of steering velocity dampens the response of this controller by reducing the torque applied to the system as higher column velocities are reached. The driver feedback is preferably arranged to be phased out at low speed to avoid impending low speed driver manoeuvres.

Figure 13:
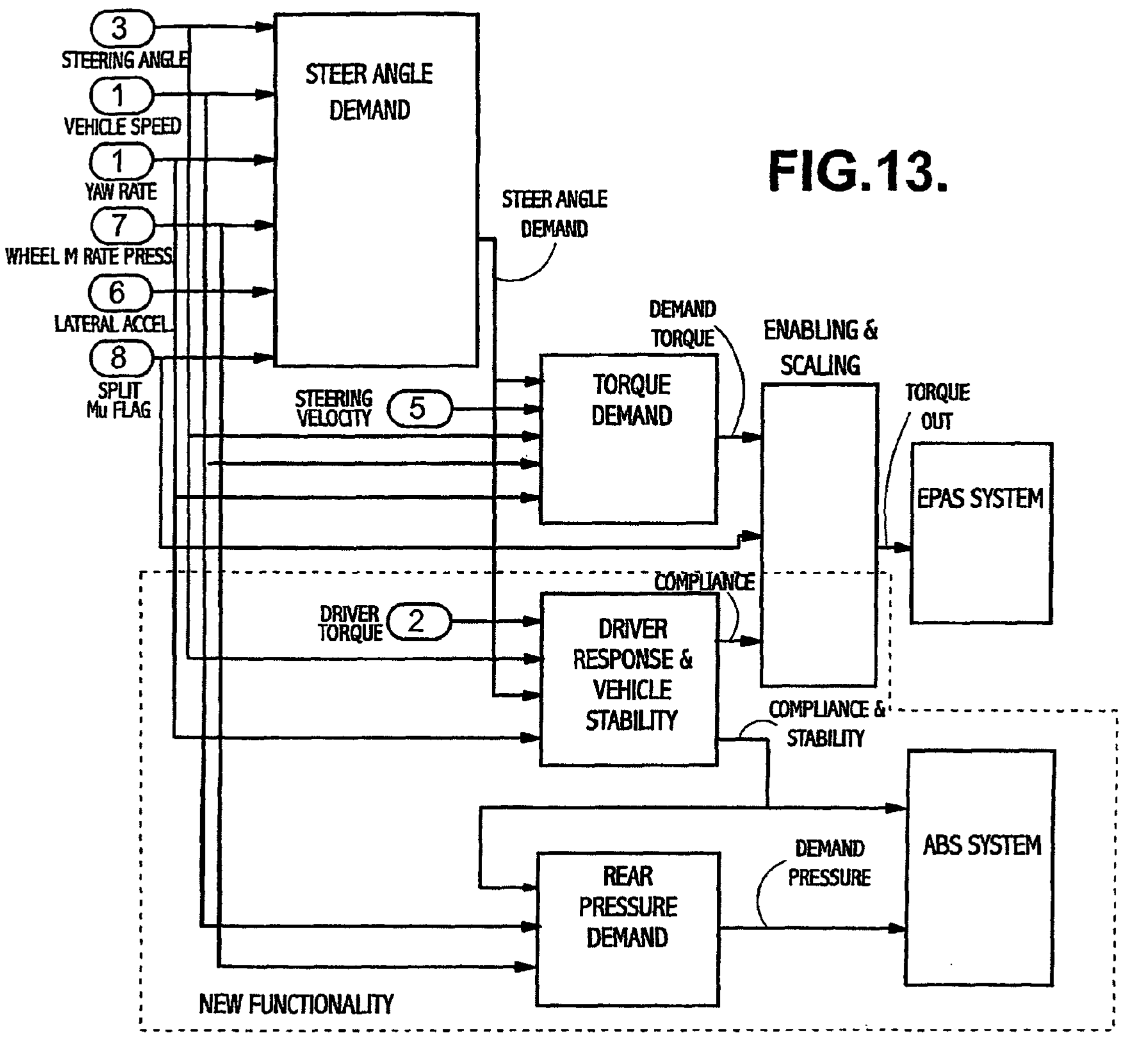
FIG. 13 is a "top level" block diagram illustrating a system embodying the invention is a whole.
Figure 23:
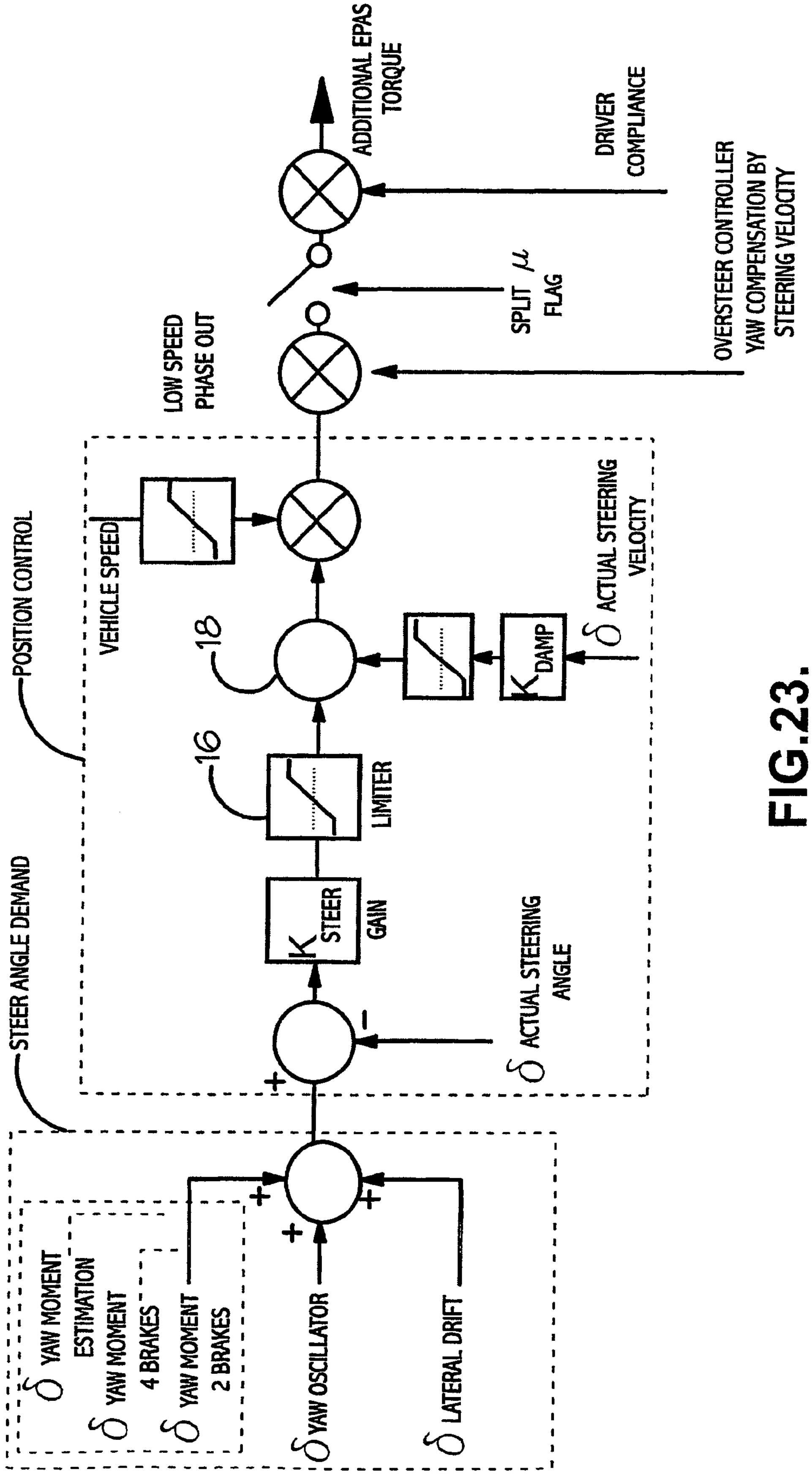
FIG. 23 is an overview of a basic embodiment of a driver feedback controller embodying the present invention which uses any of three corrective steer angles to establish a control signal which is added to the electrically assisted steering (EAS) assistance torque.

In the simple split mu controller of FIGS. 13 and 23, the output of the steering position controller would be passed via a split mu flag directly into the power steering torque control loop. However, a number of additional refinements can be made to the controlling value that is passed to the power steering system torque control loop that improve the overall response and quality of control. A first improvement can be gained by assessing the 'driver compliance'.

Assessment of Driver Compliance

The driver compliance can be defined as driver's resistance to accept the additional steering demands and typically a 'complaint driver' would be one who did not resist and 'non-compliant driver' would be one who did resist The 'driver compliance' output value can be one of the two calculated values or a combination of the two.

While the driver is complying, the control takes full authority, when the driver resists the control torque is reduced to allow the driver the influence the vehicle. There are three options for generating a value for driver compliance. The first is through rating the driver torque, the second is through rating the steer angle and finally the driver compliance can be derived from a combination of the two different methods.

In this situation, the combination could be in the form of a multiplier function or a minimum function, such as illustrated in FIG. 24. Alternatively, the multiplier could be replaced with a MIN function which only passes the minimum value of either Co-op1 or Co-op2. In all cases, a compliant driver would be indicated by a Co-op value of 1 and a non-compliant driver would be indicated by a value of zero.

(1) Driver Compliance Rating from Driver Torque

Figure 11:
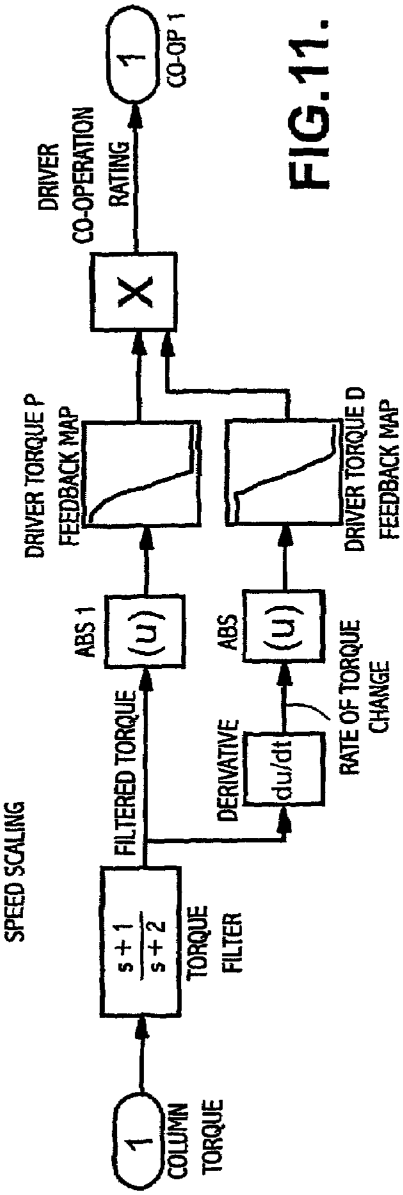
FIG. 11 illustrates driver compliance rating from driver torque.

Reference is made to FIG. 11 which shows the generation of a driver compliance factor between zero and one based upon the measured driver torque input. A low torque value indicates little resistance to movement of the steering wheel and hence a compliant driver. Conversely a high torque value indicates a high level of driver input resisting steering movement, and hence a non-compliant driver. The steering column torque input is filtered to remove high frequency components and step changes. The filtered torque is mapped against a look up table to give a driver compliance rating between zero and one. The lookup table is shaped to map low torque against a high compliance rating and high torque against a low compliance rating.

Thus, a driver compliance factor is generated so as to be between zero and one based upon the measured driver torque input. A low torque value indicates little resistance to movement of the steering wheel and hence a compliant driver. Conversely a high torque value indicates a high level of driver input resisting steering movement, and hence a non-compliant driver.

The situation can arise whereby the driver torque changes sign, passing through zero between two high torque levels. In this situation the above rating method alone is insufficient, since during the change the torque passes through zero which will generate a high compliance factor. In reality this is a transient situation during which the driver is not-complying.

To overcome this an additional term is used, the filtered driver torque being differentiated to give a rate of change of torque. In the above situation the rate of change of torque is high showing transient resistance to the steering movement. Again, conversely, a low rate of change of torque shows a steady driver input.

The rate of change of torque is mapped against a lookup table to give a driver compliance rating between zero and one. The lookup table is shaped to map low rate of change of torque against a high compliance rating and high rate of change of torque against a low compliance rating.

The rating from filtered torque and the rating from rate of change of torque are combined by multiplication. In this way a high, rapidly changing torque combines to give a low compliance rating. A low, steady torque signal combines to give a high compliance rating. The transient situation described above with a low, rapidly changing torque signal combines to give a low compliance rating.

The magnitude of driver torque level considered high, and the profile of the lookup table are tuneable dependant on the vehicle and the customer requirements.

(2) Driver Compliance Rating from Steer Angle Error

Figure 12:
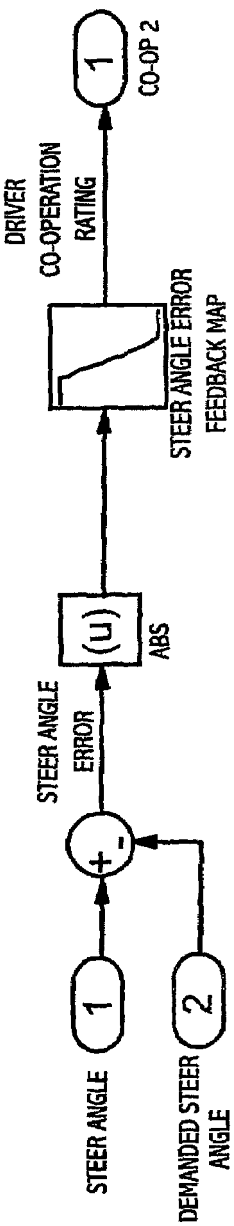
FIG. 12 illustrates driver compliance rating from steer angle error.

FIG. 12 illustrates the generation of a driver compliance factor between zero and one based upon achieved steer angle. The demand steer angle used by the IVCS control is compared to the measured steer angle to give a steer angle error. A non complying driver can override the vehicle control (IVCS) so that the demand steer is not achieved, giving an error between demanded steer angle and measured steer angle. Conversely a complying driver will allow the steering to move to the demanded angle, giving a small or zero error.

The magnitude of the steer angle error is mapped against a lookup table to give a driver compliance value between zero and one. The lookup table is shaped to map a small steer angle error against a high compliance rating and a large steer angle error against a low compliance rating.

The magnitude of a steer angle error considered large, and the profile of the lookup table are tuneable dependant on the vehicle and the customer requirements.

Thus, a driver compliance factor can be generated so as to be between zero and one based upon the achieved steer angle. The demanded steer angle used by the controller is compared to the measured steer angle to give a steer angle error. A non complying driver can override the control so that the demanded steer angle is not achieved, giving an error between demanded steer angle and measured steer angle. Conversely a complying driver will allow the steering to move to the demanded angle, giving a small or zero error.

Modification of IVCS Control with Driver Compliance

The combined demand torque is enabled through multiplication by the split mu flag as shown in FIG. 23. The torque is then scaled by the driver compliance factor. While the driver is complying, the control takes full authority. When the driver resists, the control torque is reduced to allow the driver to influence the vehicle.

FIG. 13 is a "top level" diagram which includes all of the possible approaches implemented for split mu control as described herein. FIG. 14 is an enabling and scaling diagram showing how the demand torque scaled and split mu flag enabled output torque value is applied to the steering control system.

Figure 10:
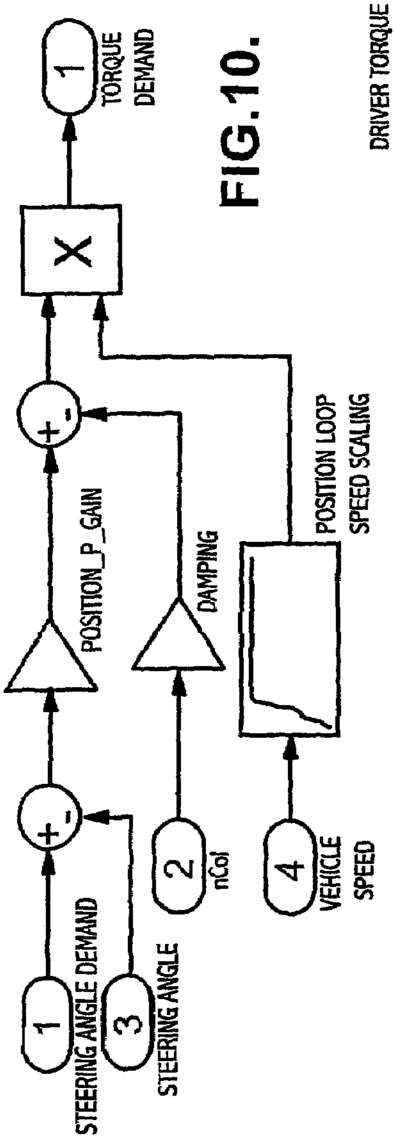
FIG. 10 illustrates steering position control to demand steer angle.
Figure 15:
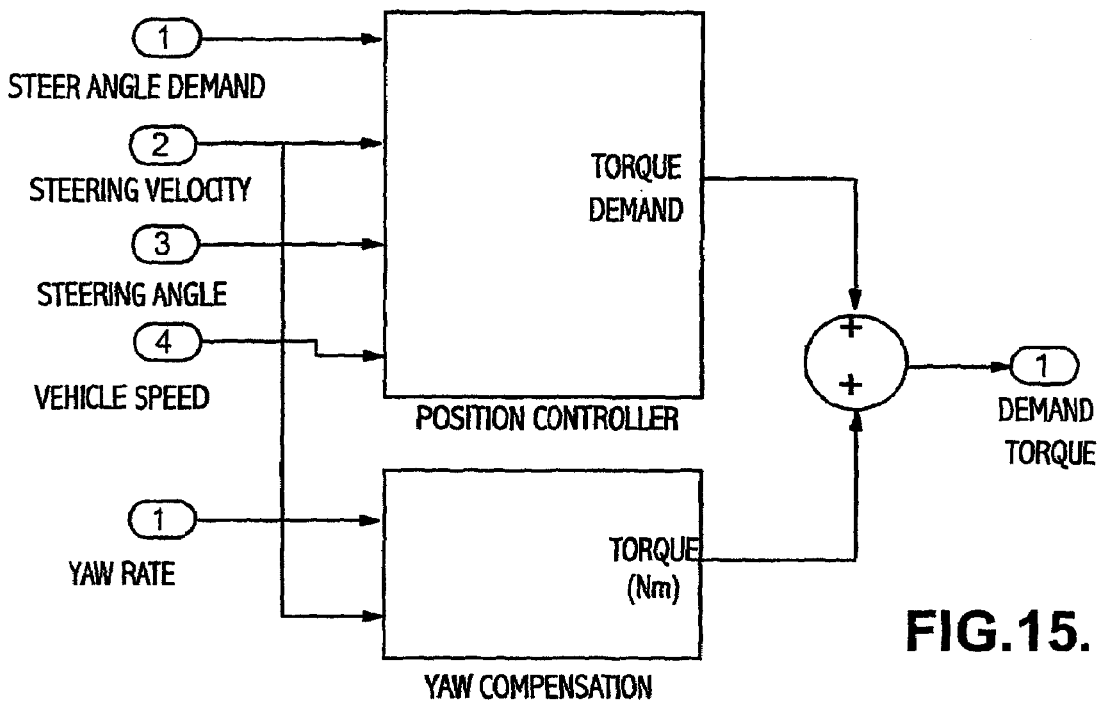
FIG. 15 illustrates torque demand.

The system of FIG. 13 comprises the control functions of "steer angle demand" (FIG. 1) "torque demand" (FIG. 15), which itself is comprised of the "position control" function (FIG. 10) and the yaw compensation function (FIG. 7).

Steering torque demand (FIG. 15) is based upon the demand steer angle or direct feedback from a signal such as yaw rate. As shown in FIG. 14, this torque demand is enabled through multiplication by a flag signaling split mu braking from the ABS, with a value of one when split mu braking is detected. The enabled signal is then multiplied by a further continuous factor between zero and one dependent on the driver response. This torque demand is sent to the EPAS to allow steering control.

Any one or more of the three steering angle demand variables (a), (b) or (c) described above can be used as the input for the driver feedback controller. However, it is preferred to have at least the first and second, i.e. yaw moment correction and yaw oscillation correction. A construction of all three variables produces a particularly improved level of dynamic vehicle control.

A further improvement may be made by shaping the steering angle demand since the control described applies steering angle earlier than an experienced driver could. A still further improvement may be to provide some feedback compensation in the case of the yaw oscillation control.

An advantage of the present system is that it encourages a driver to apply the correct steering inputs during a split mu stop so that the vehicle stops in a straight line with a minimum amount of yaw oscillation. This has several additional benefits such as to allow the ABS supplier to use a more aggressive ABS tune (no hold-off of pressure build up on the front high mu wheel, possibly no select low on the rear high-mu wheel), thus improving stopping distance.

A further advantage is that the vehicle manufacturer gains more freedom in chassis design. Straight line split mu braking and stable braking in a bend are conflicting requirements. The steering control described hereinbefore eases some of these constraints.

Further Improvements/Additions to the Braking Controller

As described above, a major benefit achievable by the present system is that the controller can stabilise the vehicle, under overall control of the driver and therefore compromises in ABS control system design can be relaxed so as to maximise that available braking utilisation without any undue affect on the vehicle stability. This we generally refer to as making the ABS braking strategy more aggressive when certain vehicle stability criteria are satisfied.

In order to determine whether a more aggressive ABS braking strategy could be used, a method of assessing the stability of the vehicle has to be implemented.

Assessment of Vehicle Stability

A vehicle stability value generated during a split-mu braking manoeuvre is generated from the yaw rate and steer angle of the vehicle. The output vehicle stability value can be one of the two calculated values or a combination of the two.

(1) Vehicle Stability Rating from Yaw Rate

Figure 16:
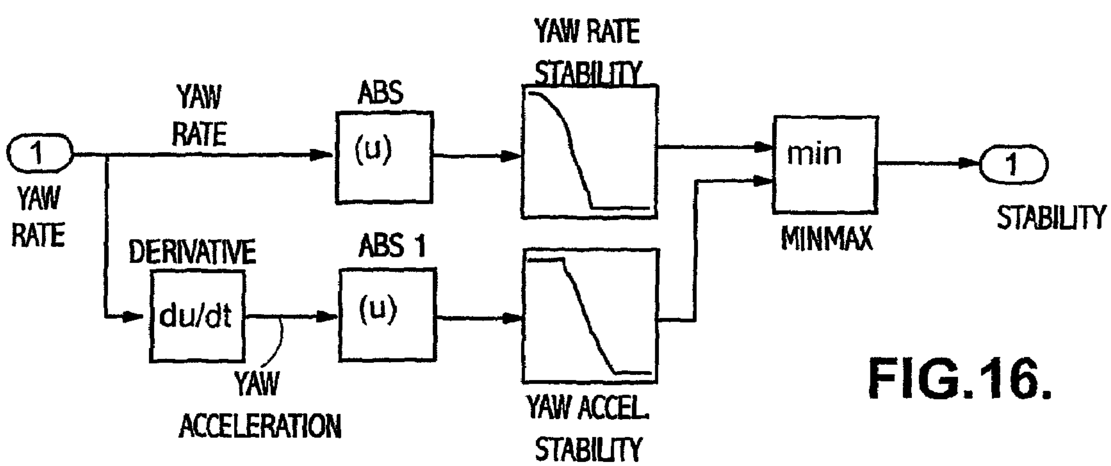
FIG. 16 illustrates vehicle stability rating from yaw rate.

Referring to FIG. 16, this diagram generates a vehicle stability factor between zero and one based upon the measured yaw rate. A low yaw rate indicates a stable vehicle. Conversely a high yaw rate value indicates a less stable vehicle.

The yaw rate is mapped against a look up table to give a vehicle stability rating between zero and one. The lookup table is shaped to map low yaw rate against a high stability rating and high yaw rate against a low stability rating.

The situation can arise whereby the yaw rate is small yet the vehicle is still unstable. For example if the driver applies an excessive steer angle to counteract a yaw rate, the vehicle's yaw rate will drop before reversing sign as the vehicle yaws in the opposite direction. In situations like this, the above rating method alone is insufficient since in changing direction the yaw rate passes through zero which would give a falsely stable vehicle rating.

To overcome this an additional term is used, the yaw rate being differentiated to give yaw acceleration. In the above situation yaw acceleration is high, showing transient vehicle instability. Again, conversely, a low yaw acceleration shows a more stable vehicle with a steady yaw rate.

The yaw acceleration is mapped against a lookup table to give a vehicle stability rating between zero and one. The lookup table is shaped to map low yaw acceleration against a high vehicle stability rating and high yaw acceleration against a low vehicle stability.

The rating from yaw rate and the rating from yaw acceleration are combined by selecting the minimum value. In this way either a high yaw rate or a high yaw acceleration give a low vehicle stability rating. A high vehicle stability rating can only be achieved from a low yaw rate and low yaw acceleration.

The magnitude of a yaw rate and yaw acceleration considered high, and the profile of the lookup table are tuneable dependant on the vehicle and the customer requirements.

(2) Vehicle Stability Rating from Steer Angle

Figure 17:
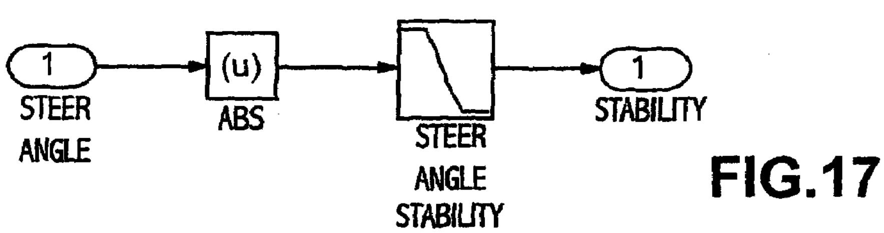
FIG. 17 illustrates vehicle stability rating from steer angle.

Referring to FIG. 17, this diagram generates a vehicle stability factor between zero and one based upon the steer angle. The steer angle required to stabilise a vehicle during a split-mu stop is often used as a measure of the vehicle's stability. A small steer angle shows a small disturbance on the vehicle and hence a stable vehicle that could be controlled by most drivers. Larger steer angles correspond to larger disturbances from more aggressive braking; this results in better stopping distance but a generally less stable vehicle.

The magnitude of the steer angle is mapped against a lookup table to give a vehicle stability rating and large steer angle against a low vehicle stability rating.

The magnitude of a steer angle considered large, and the profile of the lookup table are tuneable dependant on the vehicle and the customer requirements.

The latter two methods proposed provide a value which is indicative of the overall stability of the vehicle.

Vehicle Stability—Further Developments

As in the case of driver compliance as described above, the vehicle stability function could likewise be formed from one or other or both of the yaw rate or steer angle dependent functions and the combined function would be developed in the same way as shown above in the compliance control (FIG. 24). As before, a stable vehicle would be indicated by a function value of 1 and an unstable vehicle would be indicated by a value of zero.

Returning to the overall system diagram as shown in FIG. 13, below the "Torque Demand" function there is shown a "Driver Response & Vehicle Stability" function. This control section comprises the Driver Compliance functions and the Vehicle Stability functions. They are shown in the same control box since, in theory, a combination of the two outputs from the "Driver Compliance" and "Vehicle Stability" functions could likewise be combined as above with a simple multiplier or MIN function and used to modify the overall gain set for either or both of the power steering function or the ABS function.

Modification of the Power Steering Control In FIG. 13 the power steering control is at least modified by the Driver Compliance gain as applied to the output of the enabled Torque Demand. This scaled value is passed through to the power steering torque control function for modifying the steering control.

Modification of the ABS Control function In FIG. 13 the output of the Vehicle Stability function, optionally compensated by the Driver Compliance function, (herein after referred to as DCVS) is passed directly to the ABS system and to a Rear Pressure Demand function.

Modification of the ABS control on the front axle—the DCVS gain represented by the Vehicle Stability function is used within the ABS controller to modify the sympathetic first cycle that the high mu wheel receives when low mu wheel starts to enter ABS mode on a split mu surface. Typically, in a conventional ABS system, when the low mu wheel dumps its signal, thee high mu wheel receives a sympathetic dump signal, even though that wheel is not skidding. This is to help prevent the build up of a yawing moment caused by applying the brakes. Thereafter, once a prescribed dump period has elapsed the brakes on the high mu wheel are re-applied at a relatively slow rate. This cycle can be seen in FIG. 18.

With the improvements in stability obtained by influencing the steered action of the vehicle it is now possible to allow a greater amount of brake induced yawing moment as this will be controlled through the dynamic intervention of the steering controller.

Therefore it is now possible to increase the rate at which brake pressure is re-applied on the high mu wheel and reduce the time for which the front wheel brakes are dumped.

Figure 19:
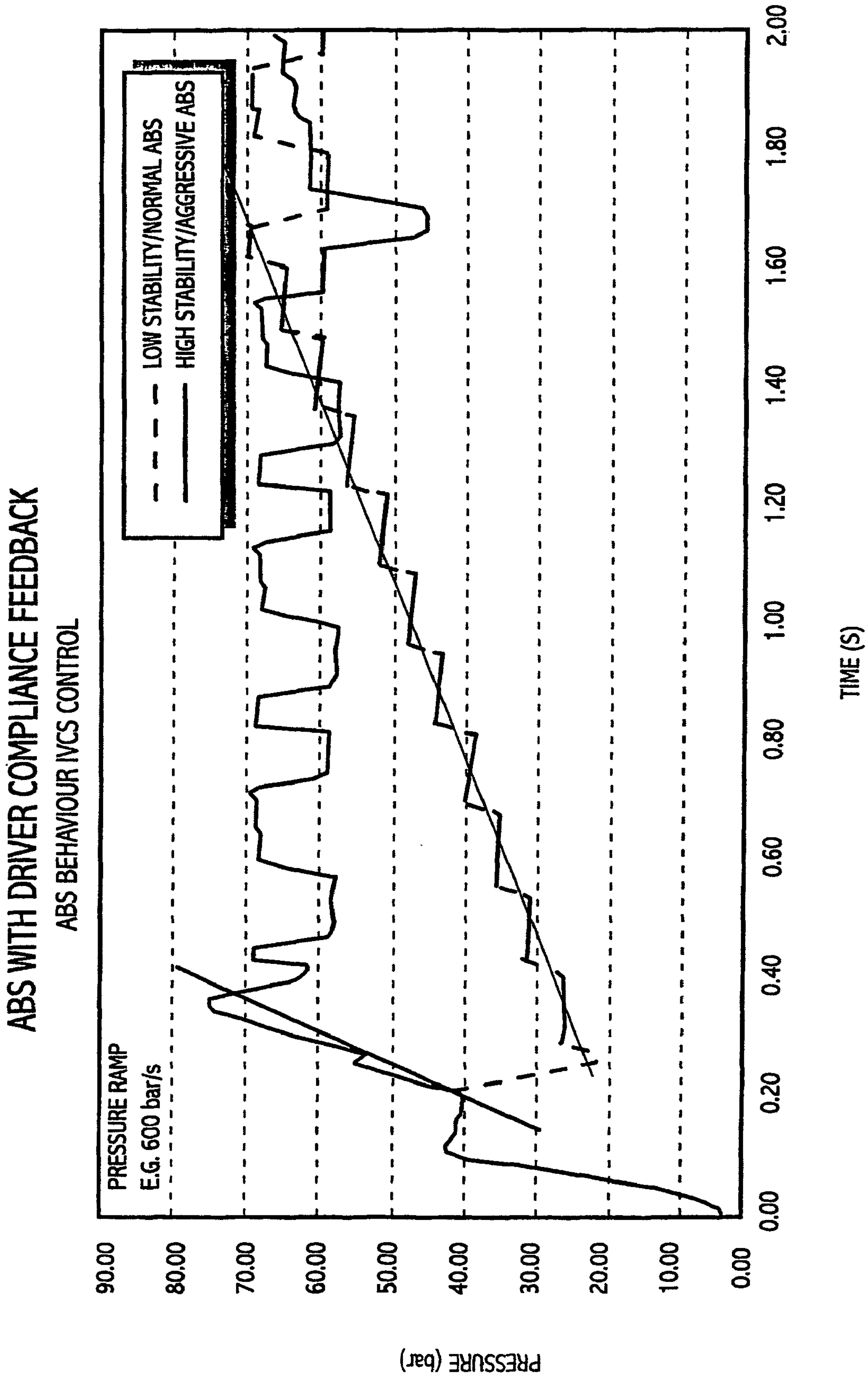
FIG. 19 illustrates ABS with driver compliance feedback.

As shown in FIG. 19 and with reference to the description hereinbefore, a more aggressive ABS braking strategy could be achieved by multiplying the prescribed sympathetic dump time for a standard sympathetic pressure dump, by the (1-DCVS) where the DCVS gain would be approaching 1 for a stable vehicle and zero for an unstable vehicle.

The actual dump time would vary in dependence upon the DCVS gain which in turn varies in accordance with the Vehicle Stability rating and optionally the Driver Compliance rating. The actual DCVS gain is determined dynamically and therefore the actual time that the brakes are dumped for would be updated during the dump phase.

Likewise, the rate at which the brake pressure is reapplied is likewise dependent upon the DCVS gain which essentially controls the time for which the pressure application valve is opened. Therefore with a DCVS gain of 1, ie. a stable vehicle, the opening time for the brake pressure application valve would be divided by (1-DCVS). Therefore, in a stable vehicle the opening time of the pressure application valve would approach constantly open whereas for an unstable vehicle the pressure application valve would only open for the prescribed (sympathetic) opening time. (See FIG. 25).

Likewise, the reapplication rate can be varied throughout the duration of the first reapplication so as to dynamically take account of the changing vehicle stability and driver compliance.

After the first sympathetic dump and reapplication, normal ABS control is resumed. On the rear axle, a typical select low routine would normally be applied but it is well known in the art that the available braking utilisation on the high mu side is lost at the rear wheel because of this strategy. Embodiments of the present invention seeks to further overcome this problem by dynamically calculating a rear brake pressure that should be demanded of the brake control system given knowledge of the front high mu brake pressure, the deceleration of the vehicle and therefore the weight transfer from rear axle to front of the vehicle and the stability/driver compliance as detected in the vehicle's dynamic state.

A pressure demand for the rear brakes is calculated based upon the above in the following manner. This pressure is applied to the rear brakes with the optional compensations, the result being that the rear wheel on the high mu side is braked at substantially higher pressure than it would have had had a conventional select low routine been used because the vehicle can now be maintained stable through influencing of the steering control. The overall effect is an improvement in the vehicle braking utilisation from the rear wheel on the high mu side which results in improved stopping performance without degrading the vehicle stability. Rear wheel pressure control during split mu braking (See description hereinbefore for Rear wheel pressure control during split mu braking diagram). The high mu rear wheel pressure demand is generated from the front high mu wheel pressure and the estimated ratio of load front/rear. Vehicle speed is differentiated to give vehicle acceleration which is used by the load transfer block. This function generates a predicted high mu side brake pressure substantially generated from a knowledge of the instantaneous front brake pressure, the brake force distribution and the weight transfer from the rear axle to the front due to the deceleration of the vehicle. In the control block of FIG. 26, the vehicle longitudinal velocity is measured and differentiated to give vehicle deceleration during braking. A load transfer value is generated from this deceleration. This load transfer estimation is described below. When enabled by the presence of a split mu flag, a rear axle demand pressure is calculated on the basis of the front brake pressure and the weight transfer value and the actual rear axle pressure is monitored as part of a closed loop control function. Again, the stability and compliance functions can be used to set the overall gain as per the front axle.

Figure 26:
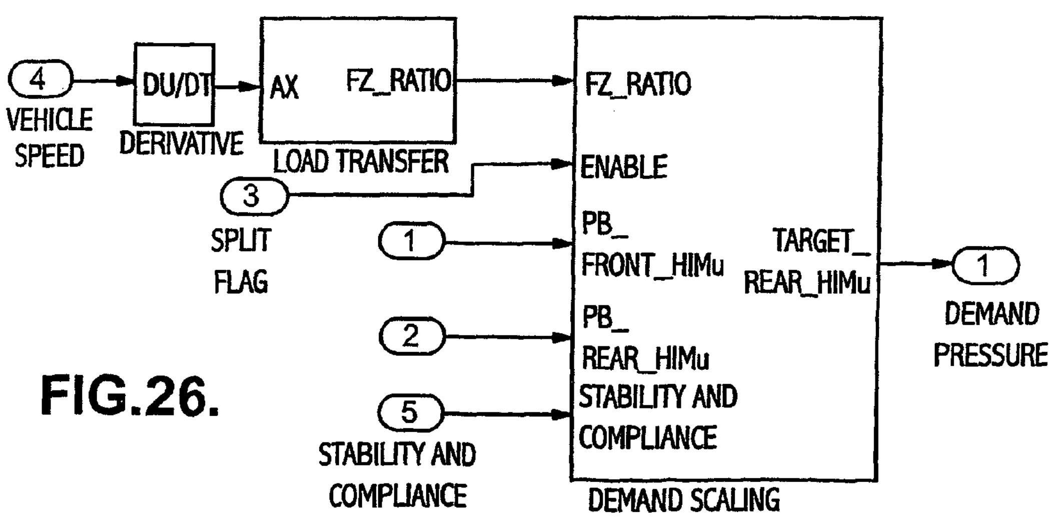
FIG. 26 is a block diagram illustrating a number of discrete control operations.

The above illustration of FIG. 26 comprises a number of discrete control operations which are discussed in outline below:

Load Transfer Estimation (see Load Transfer Estimation diagram of FIG. 21). The vehicle acceleration signal 1 multiplied by a gain (Total Vehicle Mass times Gravitational Constant Divided by Vehicle Wheelbase) to give an estimate of the dynamic front-rear load transfer caused by this deceleration. The dynamic load transfer value is added to the static front axle load and subtracted from the rear axle load to give estimated dynamic axle load. The ratio of rear to front dynamic axle load is calculated as the output from this block. This function is incorporated within the rear axle demand pressure calculation above.

Figure 22:
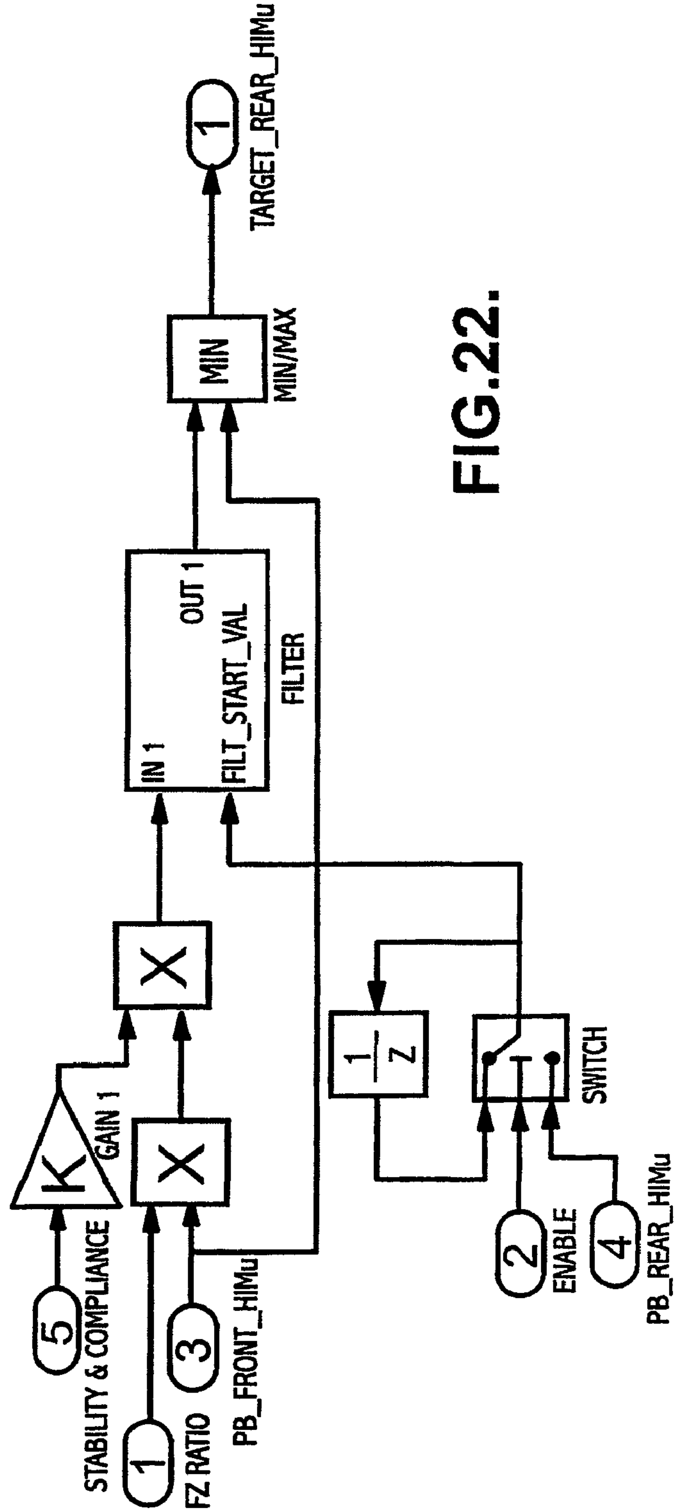
FIG. 22 illustrates demand pressure calculation.

Demand Pressure Calculation (See Demand Pressure calculation diagram of FIG. 22). The Demand Scaling function in the rear wheel Pressure control function above can be further broken down into the following ABS control method. The ABS split mu flag allows the high mu side of the car to be detected and the front and rear wheel pressures to be selected as input to this block. The rear high mu pressure demand is based on the front high mu pressure multiplied by the dynamic load ratio. The driver compliance/vehicle stability rating is multiplied by a gain to allow a maximum proportion of the demand pressure to be set. The high mu rear pressure demand is multiplied by the scaled compliance/stability rating, giving a pressure demand in proportion to the vehicle's behaviour.

Filtering and Checking (See Demand Pressure calculation diagram of FIG. 22). With reference to the above figure, the pressure on the high mu rear wheel when split mu is detected is latched for the duration of the stop. To prevent the demand pressure following every ABS pressure cycle of the front wheel the demand pressure is filtered. The filter is reset at the start of the stop by the split mu flag being set, and the filter is initialised from the latched rear wheel pressure at the start of the stop and when the split mu flag is enabled. This ensures that there has been sufficient pressure applied to provide a substantial braking effect, therefore ensuring that the rear wheel pressure demand is both non-zero and approximately equal to the calculated maximum for the surface.

A final check is carried out by ensuring that the demand rear pressure can never exceed the measured front high mu pressure. This is done by selecting the minimum value of the filtered demand pressure and the measured front high mu pressure. The resulting value is output as the rear pressure demand to ABS.

Figure 27:
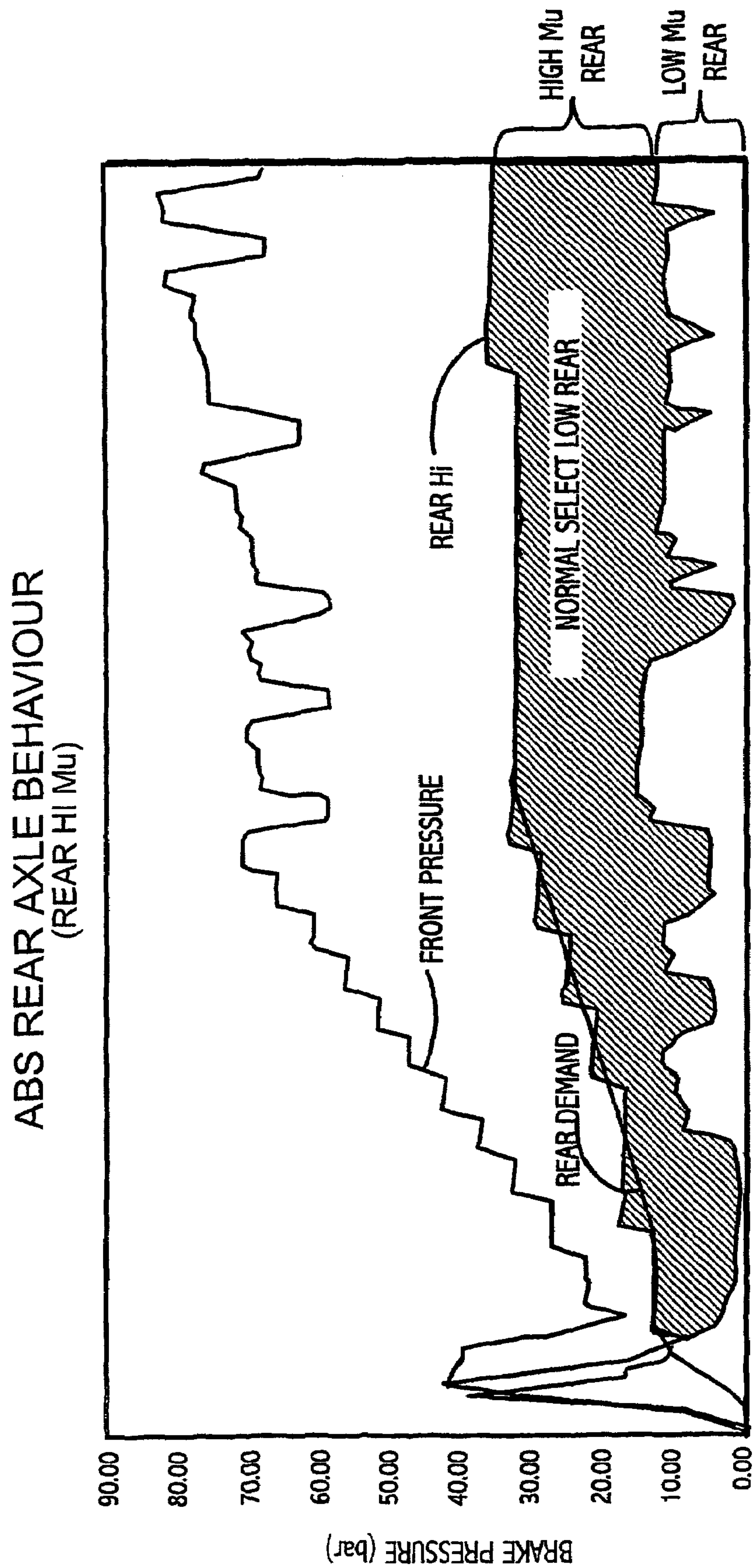
FIG. 27 comprises a number of curves illustrating ABS rear axle behaviour.

The ABS system then uses this demand to calculate the appropriate solenoid firing times for controlling the rear brake pressure within the rear brake pressure control function. This function can be seen in the illustration of FIG. 27.

Modification of ABS Behaviour with IVCS (1) Modification of Front Axle Yaw Control Behaviour with Driver Compliance and Vehicle Stability Referring to the top level diagram of FIG. 13, the vehicle stability and driver compliance rating is sent to the ABS controller. Dependent on these ratings the initial yaw control of the ABS is modified.

(a) Low Rating—Normal ABS behaviour
- Brakes Applied on split surface
- Split detected by ABS, split mu flag set to high
- (IVCS Steering control enabled)
- High mu front wheel reduces pressure in sympathy with front low mu wheel
- High mu front wheel slowly increases pressure until slip threshold is reached (b) Mid Rating—More Aggressive ABS Behaviour
- Brakes Applied on split surface
- Split detected by ABS, split mu flag set to high
- (IVCS steering control enabled)
- Sympathetic pressure reduction on from high mu wheel reduced
- Faster increase in pressure on high mu front wheel until slip threshold is reached.

(c) High Rating—Aggressive ABS Behaviour
- Brakes Applied on split surface
- Split detected by ABS, split mu flag set to high
- (IVCS steering control enabled)
- Sympathetic pressure reduction on front high mu wheel disabled
- Rapid increase in pressure on high mu front wheel until slip threshold is reached.

Figure 18:
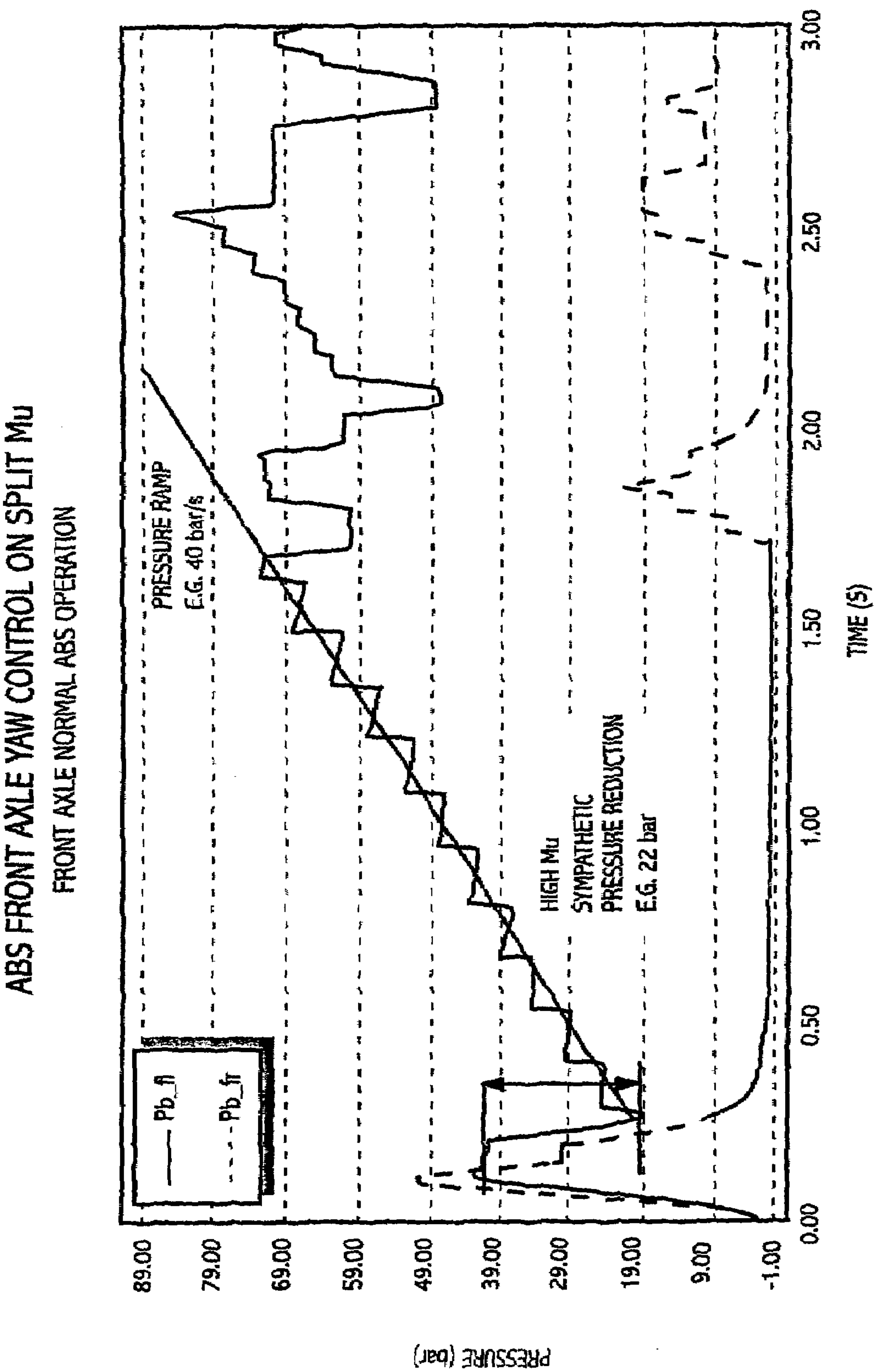
FIG. 18 illustrates ABS front axle yaw control on split mu.

FIG. 18 shows a diagram of normal ABS behaviour on the front axle during split-mu braking. FIG. 19 shows the two extremes corresponding to (a) and (b) above. As the compliance and stability rating varies between zero and one, the level of pressure reduction and the rate of pressure ramp is varied continuously.

Rear Wheel Pressure Control During Split Mu Braking

Reference is made to FIG. 20. The high mu rear wheel pressure demand is generated from the front high mu wheel pressure and the estimated ratio of load front/rear. Vehicle speed is differentiated to give vehicle acceleration which is used by the load transfer block.

Load Transfer Estimation

Referring to FIG. 21, the vehicle acceleration signal I is multiplied by a gain (Total Vehicle Mass time Gravitational Constant Divided by Vehicle Wheelbase) to give an estimate of the dynamic front-rear load transfer caused by this deceleration.

The dynamic load transfer value is added to the static front axle load and subtracted from the rear axle load to give estimated dynamic axle load. The ratio of rear to front dynamic axle load is calculated as the output from this block.

Demand Pressure Calculation

Referring to FIG. 22, the abs split flag allows the high mu side of the car to be detected and the front and rear wheel pressures to be selected as inputs to this block. The rear high mu pressure demand is based on the front high mu pressure multiplied by the dynamic load ratio.

Modification of Demand Pressure with Driver Compliance and Vehicle Stability

Referring again to FIG. 22, the driver compliance/vehicle stability rating is multiplied by a gain to allow a maximum proportion of the demand pressure to be set. The high mu rear pressure demand is multiplied by the scaled compliance/stability rating, giving a pressure demand in proportion to the vehicle's behaviour.

Filtering and Checking

Referring again to FIG. 22, the pressure on the high mu rear wheel when split mu is detected is latched for the duration of the stop. To prevent the demand pressure following every ABS pressure cycle of the front wheel the demand pressure is filtered. The filter is reset at the start of the stop by the split mu flag being set, and the filter is initialised from the latched rear wheel pressure at the start of the stop.

A final check is carried out by ensuring that the demand rear pressure can never exceed the measured front high mu pressure. This is done by selecting the minimum value of the filtered demand pressure and the measured front high mu pressure. The resulting value is output as the rear pressure demand to ABS.

The aforegoing system is capable of achieving a number of advantages operating characteristics, including one or more of the following:

(1) vehicle stability enhancement through steering control, including adjustment of self centering and feel of the steering during split mu braking to main vehicle stability.

(2) Low frequency compensation from yaw moment estimate, wherein estimated yaw moment is used to demand angular offset of steering.

(3) Higher frequency compensation by steer velocity control wherein steering velocity control is generated from vehicle yaw rate.

(4) Higher frequency compensation from yaw rate feedback wherein direct feedback of vehicle yaw rate is converted into demand steering angle.

(5) Lateral drift compensation from lateral acceleration wherein proportional and integral compensation based on vehicle lateral acceleration is used to generate demand steering angle.

(6) Yaw moment estimation from bake pressure wherein a yaw moment estimate is generated from difference in front brake pressure.

(7) Yaw moment estimation through vehicle model and feedback loop involving modification of a two degree-of-freedom vehicle model and observation of yaw moment through feedback of yaw rate error.

(8) Assessment of driver behaviour wherein column torque is used as a measure of driver behaviour and compliance with the active steering system.

(9) Assessment of vehicle stability wherein yaw rate is used as a measure of vehicle stability and steer angle is used as a measure of vehicle stability during split mu braking.

(10) Modification of control with driver behaviour wherein driver behaviour assessment is used for scaling of system demand torque, to prevent overriding the driver.

(11) Modification of ABS behaviour with driver behaviour and vehicle stability.

(12) Modification of ABS behaviour using modification of front axle ABS yaw control behaviour with driver behaviour and vehicle stability and ABS pressure control of rear high mu wheel during a split mu stop.

(13) Generation of rear pressure demand wherein rear high mu wheel demand pressure is generated from vehicle dynamics data and vehicle parameters and rear high mu wheel demand pressure is modified with driver behaviour and vehicle stability.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle stability compensation system which is arranged to adjust dynamically a self-centering position and the steering feel of an electrically assisted steering system during a split mu braking operation, the stability compensation system comprising:

means for establishing at least one operational variable representing a corrective steer angle for the vehicle and hence representing a target self-centering position;

a driver feedback controller that is adapted to be connected to a vehicle steering system and that takes the at least one operational variable representative of the target self-centering position and subtracts therefrom an actual vehicle steering angle to derive a target self-centering error; and gain means for establishing a torque demand proportional to said target self-centering error, the torque demand being added to an assistance torque generated by the electrically assisted steering system to shift the self-centering position so as to encourage the vehicle driver to move the steering wheel such as to reduce the target self-centering error to zero for maintaining the vehicle stable and controllable.

2. A vehicle stability compensation system as claimed in claim 1, further including a means for establishing a braking yaw moment as said operational variable representative of said corrective steer angle.

3. A vehicle stability compensation system as claimed in claim 2, wherein said braking yaw moment is established by generating and subtracting from each other estimates of the brake pressures at the front left and front right wheels, multiplying the difference by a constant to give the difference in brake forces for the front wheels, and dividing the result by a track width of the vehicle.

4. A vehicle stability compensation system as claimed in claim 3, wherein said braking yaw moment is multiplied by a gain to give the corrective steer angle.

5. A vehicle stability compensation system as claimed in claim 2, wherein said braking yaw moment is generated by a vehicle model and a compensator, said vehicle model being responsive to the vehicle speed and steer angle to generate an estimated vehicle yaw rate, said yaw estimated vehicle yaw rate being subtracted from an actual vehicle yaw rate to obtain a yaw rate error which is then passed through said compensator to generate said braking yaw moment.

6. A vehicle stability compensation system as claimed in claim 2, wherein a steer angle error is established by subtracting said corrective steer angle from actual steer angle.

7. A vehicle stability compensation system as claimed in claim 1, further including a means for establishing a yaw oscillation moment as said operational variable representative of said corrective steer angle.

8. A vehicle stability compensation system as claimed in claim 7, wherein said yaw oscillation moment is established by inverting a yaw rate signal and then multiply the inverted yaw rate signal by a gain, the result being used as a feedback signal providing yaw oscillation correction.

9. A vehicle stability compensation system as claimed in claim 1, further including means for establishing a lateral drift correction as said operational variable representative of said corrective steer angle.

10. A vehicle stability compensation system as claimed in claim 9, wherein said lateral drift correction is established by inverting a vehicle lateral acceleration signal of an inverter and applying proportional plus integral compensation at a P-I compensator to provide the lateral drift correction.

11. A vehicle stability compensation system as claimed in claim 1, wherein said torque demand proportional to the target self-centering error is added to the assistance torque generated by the electrically assisted steering system by way of a limiter.

12. A vehicle stability compensation system as claimed in claim 11, further including means enabling steering velocity feedback to be applied to prevent the shift resulting in under-damped steering oscillations.

13. A vehicle stability compensation system as claimed in claim 12, wherein the steering velocity feedback is provided by the means is arranged to be phased out at lower speeds to avoid impeding low speed driver maneuvers.

14. A vehicle stability compensation system as claimed in claim 1, further including a means for establishing a yaw oscillation correction as said operational variable representative of a corrective steering velocity.

15. A vehicle stability compensation system as claimed in claim 14, wherein said operational variable of corrective steering velocity is compared to an actual steering velocity and the difference is added to the EAS assistance torque.

16. A vehicle stability compensation system as claimed in claim 1, further including a means for deriving a driver compliance rating corresponding to a driver's resistance to accept additional steering demands provided by the system.

17. A vehicle stability compensation system as claimed in claim 16, wherein said means for deriving said driver compliance rating includes using a lookup map based on an operational variable steering column torque.

18. A vehicle stability compensation system as claimed in claim 17, wherein said driver compliance rating is established based on a multiplication of the steering column torque by a rate of change of driver steering torque.

19. A vehicle stability compensation system as claimed in claim 16, wherein said means for deriving said driver compliance rating includes using a lookup map based on an operational variable rate of change of driver steering torque.

20. A vehicle stability compensation system as claimed in claim 16, wherein said means for deriving said driver compliance rating includes using a lookup map based on an operational variable steer angle error.

21. A vehicle stability compensation system as claimed in claim 20, wherein a combination of driver compliance ratings is established based on said steer angle error and a product of steering column torque and a rate of change of driver steering torque.

22. A vehicle stability compensation system as claimed in claim 16, wherein said driver compliance rating is used to scale the EAS assistance torque for the purposes of preventing excessive torque application.

23. A vehicle stability compensation system as claimed in claim 1 wherein said operational variable representative of said corrective steer angle is a vehicle yaw rate and further wherein a vehicle model is used to generate an estimate of yaw rate from a vehicle speed and a steer angle.

24. A vehicle stability compensation system as claimed in claim 23, wherein said estimated yaw rate is subtracted from an actual vehicle yaw rate to give a yaw rate error.

25. A vehicle stability compensation system as claimed in claim 24 wherein said yaw rate error is passed through a compensator in order to estimate a yaw moment causing the yaw rate error.

26. A vehicle stability compensation system as claimed in claim 25 wherein said estimated yaw moment is used to modify the yaw behavior of said vehicle model.

27. A vehicle stability compensation system as claimed in claim 1, including means for establishing a value representative of vehicle stability.

28. A vehicle stability compensation system as claimed in claim 27, wherein said vehicle stability value is established using a lookup map based on an operational variable actual yaw rate.

29. A vehicle stability compensation system as claimed in claim 28, wherein a combination of vehicle stability rating is established by multiplying said actual a yaw rate by yaw acceleration.

30. A vehicle stability compensation system as claimed in claim 29, wherein a combination of vehicle stability ratings is established by multiplying together said vehicle stability rating and a vehicle value established using a lookup table based on operational variable steer angle.

31. A vehicle stability system as claimed in claim 30 wherein said vehicle stability rating combined with a driver compliance rating corresponding to a driver's resistance to accept additional steering demands provided by the system by multiplication.

32. A vehicle stability compensation system as claimed in claim 27, wherein said vehicle stability value is established using a lookup map based on an operational variable yaw acceleration.

33. A vehicle stability compensation system as claimed in claim 32, wherein a combination of vehicle stability rating is established by multiplying said yaw acceleration by an actual yaw rate.

34. A vehicle stability compensation system as claimed in claim 27, wherein said vehicle stability value is established using a lookup table based on an operational variable steer angle.

35. A vehicle stability compensation system as claimed in claim 1 having means for variation of an ABS initial sympathetic pressure dump, the dump valve open time being based upon at least one of a driver compliance rating corresponding to a driver's resistance to accept additional steering demands provided by the system and a vehicle stability rating obtained from one of multiplying actual yaw rate by a yaw acceleration and a lookup table.

36. A vehicle stability compensation system as claimed in claim 1 having means for variation of an ABS front high mu pressure ramp, an apply valve open time being based upon at least one of a driver compliance rating corresponding to a driver's resistance to accept additional steering demands provided by the system and a vehicle stability rating obtained from one of multiplying an actual yaw rate by a yaw acceleration and a lookup table.

37. A vehicle stability system as claimed in claim 1, having means for generating an estimated vertical load split from vehicle deceleration and vehicle parameters.

38. A vehicle stability compensation system as claimed in claim 37, including means for generating rear pressure demand by multiplying a measured front high mu brake pressure by said estimated vertical load ratio.

39. A vehicle stability compensation system as claimed in claim 38, wherein a rear pressure demand is scaled by multiplication by driver's compliance rating corresponding to a driver's resistance to accept additional steering demands provided by the system.

40. A vehicle stability compensation system as claimed in claim 39 in which said rear pressure demand is passed through a filter to remove high pressure frequency components and rapid changes from a demand pressure signal.

41. A vehicle stability compensation system as claimed in claim 40 including means for activation of said filter by an enabling split mu flag from a vehicle ABS whereby an initial value of said filter is set to be as an instantaneous value of a measured rear high mu brake pressure for removing any lag introduced by activation of said filter at a value of zero.

42. A vehicle stability compensation system as claimed in claim 41, further including means for modification of the ABS to control a high mu rear pressure to demand pressure.

* * * * *

UNITED STATES PATENT AND TRADEMARK OFFICE

CERTIFICATE OF CORRECTION

PATENT NO. : 6,968,920 B2 Page 1 of 1
DATED : November 29, 2005
INVENTOR(S) : Andrew Dennis Barton et al.

It is certified that error appears in the above-identified patent and that said Letters Patent is hereby corrected as shown below:

Column 15,
Line 45, delete “as said” and insert -- with an --.

Column 16,
Line 38, change “actual a yaw rate by yaw” to -- actual yaw rate by a yaw --.

Signed and Sealed this

Thirty-first Day of January, 2006

JON W. DUDAS
*Director of the United States Patent and Trademark Office*